(12) United States Patent
Volkerink et al.

(10) Patent No.: US 11,687,748 B2
(45) Date of Patent: Jun. 27, 2023

(54) SYSTEMS AND METHODS FOR MONITORING LOADING OF CARGO ONTO A TRANSPORT VEHICLE

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/944,972

(22) Filed: Sep. 14, 2022

(65) Prior Publication Data

US 2023/0116060 A1    Apr. 13, 2023

Related U.S. Application Data

(62) Division of application No. 17/069,651, filed on Oct. 13, 2020, now Pat. No. 11,487,958.

(60) Provisional application No. 62/914,537, filed on Oct. 13, 2019.

(51) Int. Cl.
| | |
|---|---|
| H04N 5/44 | (2011.01) |
| G06K 7/10 | (2006.01) |
| H04B 17/318 | (2015.01) |
| G06F 8/71 | (2018.01) |

(52) U.S. Cl.
CPC ........ G06K 7/10445 (2013.01); G06F 8/71 (2013.01); G06K 7/10297 (2013.01); H04B 17/318 (2015.01)

(58) Field of Classification Search
CPC .. G06K 7/10445; G06K 7/10297; G06F 8/71; H04B 17/318
See application file for complete search history.

(56) References Cited

U.S. PATENT DOCUMENTS

| | | | |
|---|---|---|---|
| 7,922,085 B2 * | 4/2011 | Thomas | G06Q 10/08 235/492 |
| 9,721,226 B2 | 8/2017 | Minogue et al. | |
| 10,244,364 B1 | 3/2019 | Beard | |

(Continued)

FOREIGN PATENT DOCUMENTS

| | | |
|---|---|---|
| AU | 2018204317 A1 | 1/2019 |
| CA | 3008512 A1 | 12/2018 |

OTHER PUBLICATIONS

PCT Application No. PCT/US2020/055408, International Search Report and Written Opinion, dated Feb. 25, 2021, 11 pages.

(Continued)

*Primary Examiner* — Munear T Akki (57) ABSTRACT

Systems and methods monitor loading of cargo onto a transport vehicle to avoid incorrect cargo loading incidents. A wireless monitoring device positioned near an access port of a cargo hold of the transport vehicle receives a tracking identifier of a wireless tracking tag attached to a logistic container containing the cargo as the logistic container is conveyed into the cargo hold. An alert is generated by the wireless monitoring device when the tracking identifier is not listed in a manifest listing identifiers of wireless tracking tags attached to logistic containers expected to be loaded into the cargo hold. Within the cargo hold, the wireless tracking tags may also exchange their tracking identifiers such that any one of the wireless tracking tags may determine, by counting, when less than a target threshold number of wireless tracking tags are present.

20 Claims, 8 Drawing Sheets

(56) References Cited

U.S. PATENT DOCUMENTS

| | | | |
|---|---|---|---|
| 10,679,172 B2* | 6/2020 | Burch, V | H04W 4/48 |
| 10,748,109 B2* | 8/2020 | Benjamin | G06Q 10/0832 |
| 11,115,732 B2 | 9/2021 | Lucrecio et al. | |
| 2006/0197652 A1* | 9/2006 | Hild | G06K 7/10356 |
| | | | 340/10.2 |
| 2008/0100450 A1 | 5/2008 | Ayyagari et al. | |
| 2012/0232942 A1 | 9/2012 | Gaug et al. | |
| 2014/0163857 A1 | 6/2014 | Melum et al. | |
| 2014/0344118 A1 | 11/2014 | Parpia et al. | |
| 2015/0206096 A1 | 7/2015 | Fernandez | |
| 2015/0248838 A1 | 9/2015 | Stone et al. | |
| 2017/0140656 A1 | 5/2017 | Mott et al. | |
| 2018/0096289 A1 | 4/2018 | Terwilliger et al. | |
| 2019/0101650 A1 | 4/2019 | McKeown et al. | |
| 2019/0236732 A1* | 8/2019 | Speasl | G05D 1/0219 |
| 2020/0137360 A1* | 4/2020 | Somers | G08B 13/19647 |
| 2020/0300960 A1* | 9/2020 | Murphy | B64D 45/0059 |
| 2021/0284449 A1* | 9/2021 | Rogers | G05B 15/02 |
| 2021/0319683 A1* | 10/2021 | Daw Perez | G08B 21/18 |

OTHER PUBLICATIONS

Examination Report No. 1 for Australian Patent Application No. 2020368350 dated Sep. 30, 2022, 6 pages.

\* cited by examiner

SYSTEMS AND METHODS FOR MONITORING LOADING OF CARGO ONTO A TRANSPORT VEHICLE

RELATED APPLICATION

This Application is a divisional of pending U.S. patent application Ser. No. 17/069,651, filed Oct. 13, 2020, which claims priority to U.S. Patent Provisional Application No. 62/914,537, filed Oct. 13, 2019, all of which are incorporated herein by reference in their entirety.

BACKGROUND

Embodiments disclosed herein generally relate to monitoring loading of cargo onto a transport vehicle, and more specifically to a method and an apparatus for detecting and avoiding incorrect cargo loading incidents.

SUMMARY

In one aspect of the present embodiments, a system monitors loading of assets (e.g., cargo in logistic containers) onto a transport vehicle. Each asset and/or logistic container has a respective wireless tracking tag attached thereto. Each wireless tracking tag has a globally unique tracking identifier, a battery, a processor, a memory with machine-readable instructions, and a wireless communications interface. The system further includes a wireless monitoring device affixed to a cargo loader (e.g., a stationary portion or non-moving part) and has a globally unique identifier, a battery, a processor, a memory comprising machine-readable instructions, and a wireless communications interface. The cargo loader conveys the assets and/or logistic containers to a cargo hold of the transport vehicle. The wireless monitoring device includes a manifest storing expected unique tracking identifiers assigned to cargo scheduled to be conveyed to the cargo hold of the transport vehicle. As each asset and/or logistic container is loaded into the cargo hold of the transport vehicle, the wireless monitoring device communicates with the attached wireless tracking tags to receive its unique tracking identifier and then correlates the unique tracking identifier with the manifest. When the wireless monitoring device detects that the unique tracking identifier read from the wireless tracking tag does not match the manifest, the wireless monitoring device generates an alert identifying the discrepancy.

In another aspect of the present embodiments, a system monitors loading of cargo onto a transport vehicle includes a wireless monitoring device deployed with a cargo hold of a transport vehicle. The wireless monitoring device has a globally unique identifier, a battery, a processor, a memory comprising machine-readable instructions, and a wireless communications interface. The monitoring system further includes wireless tracking tags attached to respective assets and/or logistic containers containing assets, wherein each wireless tracking tag comprises a globally unique tracking identifier, a battery, a processor, a memory comprising machine-readable instructions, and a wireless communications interface. The wireless monitoring device is operative to communicate with each of the wireless tracking tags and comprises a manifest storing a listing of cargo scheduled to be conveyed to the cargo hold of the transport vehicle correlated with the one or more globally unique tracking identifiers of the wireless tracking tags, wherein the wireless monitoring device is operative to identify discrepancies between the cargo listed in the manifest and the correlated globally unique tracking identifiers of the wireless tracking tags on the assets and/or logistic containers being conveyed to the cargo hold of the transport vehicle.

In another aspect of the present embodiments, a method of monitoring loading of assets (e.g., cargo) onto a transport vehicle includes attaching wireless tracking tags to respective assets and/or logistic containers containing the assets, wherein each wireless tracking tag comprises a globally unique identifier, a battery, a processor, a memory comprising machine-readable instructions, and a wireless communications interface. A wireless monitoring device is affixed to a stationary location (e.g., a non-moving portion) of a cargo loader that is operative to convey the assets and/or logistic containers to a cargo hold of a transport vehicle, wherein the wireless monitoring device comprising a globally unique identifier, a battery, a processor, a memory comprising machine-readable instructions, and a wireless communications interface. The wireless monitoring device communicates with each of the wireless tracking tags and comprising a manifest storing a listing of cargo scheduled to be conveyed to the cargo hold of the transport vehicle correlated with the one or more globally unique tracking identifiers of the wireless tracking tags. The wireless monitoring device is operative to identify discrepancies between the cargo listed in the manifest and the correlated globally unique tracking identifiers of the wireless tracking tags on the assets and/or logistic containers being conveyed to the cargo hold of the transport vehicle.

In another aspect, a method of monitoring loading of cargo onto a transport vehicle includes affixing a wireless monitoring device to a stationary location of a cargo hold of a transport vehicle, the wireless monitoring device comprising a globally unique identifier, a battery, a processor, a memory comprising machine-readable instructions, and a wireless communications interface. Wireless tracking tags are attached to respective assets and/or logistic containers containing the assets, wherein each wireless tracking tag comprises a globally unique tracking identifier, a battery, a processor, a memory comprising machine-readable instructions, and a wireless communications interface. The wireless monitoring device communicates with each of the wireless tracking tags and includes a manifest storing a listing of cargo scheduled to be conveyed to the cargo hold of the transport vehicle correlated with the one or more globally unique tracking identifiers of the wireless tracking tags. The wireless monitoring device is operative to identify discrepancies between the cargo listed in the manifest and the correlated globally unique tracking identifiers of the wireless tracking tags on the assets and/or logistic containers being conveyed to the cargo hold of the transport vehicle.

A system comprises a unitary wireless device, comprising a battery, a processor, a memory comprising machine-readable instructions, an Automatic Dependent Surveillance-Broadcast (ADS-B) receiver configured to wirelessly link to sources of ADS-B out signals in accordance with a first wireless communications protocol. When executed by the processor, the machine-readable instructions cause the processor to perform operations comprising linking to at least three sources of ADS-B out signals comprising respective estimated locations of the at least three signal sources and determining an estimated position of the wireless device based on the estimated locations of the at least three signal sources.

Certain embodiments herein also feature an apparatus operable to implement the method described above and computer-readable media storing computer-readable instructions causing a computer to implement the method described above.

In one embodiment, a system monitors loading of cargo onto a transport vehicle. A wireless tracking tag, attached to an asset and/or a logistic container containing the assets (e.g., cargo), includes: a first battery; a first wireless communications interface; a first processor; and a first memory communicatively coupled with the first processor and storing: a tracking identifier that uniquely identifies the wireless tracking tag; and first firmware having machine-readable instructions that are executable by the first processor. A wireless monitoring device, located near a cargo hold of the transport vehicle, includes: a second battery; a second wireless communications interface; a second processor; a second memory communicatively coupled with the second processor and storing: a device identifier that uniquely identifies the wireless monitoring device; a manifest including tracking identifiers corresponding to wireless tracking tags attached to assets and/or logistic containers expected to be loaded onto the transport vehicle; and second firmware having machine-readable instructions that, when executed by the second processor, cause the second processor to: receive the tracking identifier from the wireless tracking tag as the asset and/or the logistic container is conveyed to the cargo hold; and identify a discrepancy when the tracking identifier is not listed in the manifest.

In another embodiment, a method monitors loading of cargo onto a transport vehicle. The method includes: receiving, by a wireless monitoring device positioned near an access port of a cargo hold of the transport vehicle, a tracking identifier of a wireless tracking tag attached to an asset and/or a logistic container containing the asset (e.g., cargo) as the asset and/or the logistic container is conveyed into the cargo hold; and generating an alert, by the wireless monitoring device, when the tracking identifier is not listed in a manifest listing identifiers of wireless tracking tags attached to assets and/or logistic containers expected to be loaded into the cargo hold.

In another embodiment, a wireless tracking tag includes: a battery; an Automatic Dependent Surveillance-Broadcast (ADS-B) out receiver implementing a first wireless communication protocol; a processor; and memory storing machine-readable instructions that, when executed by the processor, cause the processor to: control the ADS-B out receiver to (a) receive a first ADS-B out signal transmitted by a first transport vehicle, (b) receive a second ADS-B out signal transmitted by a second transport vehicle, different from the first transport vehicle, and (c) receive a third ADS-B out signal transmitted by a third transport vehicle, different from both the first transport vehicle and the second transport vehicle; and estimate a current location of the wireless tracking tag based on locations defined in at least one of the first ADS-B out signal, the second ADS-B out signal, and the third ADS-B out signal.

In another embodiment, a wireless monitoring device includes: a battery; an RF transceiver implementing a first wireless communication protocol; a processor; and memory storing machine-readable instructions that, when executed by the processor, cause the processor to: receive a wireless signal containing a tracking identifier from a wireless tracking tag attached to and asset and/or a logistic container containing the assets being conveyed into a cargo hold of a transport vehicle; determine a signal strength of the wireless signal; and transmit an alert to a network service when the signal strength indicates that the wireless tracking tag was not loaded into the cargo hold of the transport vehicle.

In another embodiment, a system monitors loading of cargo onto a transport vehicle. The system includes a wireless tracking tag attached to a logistic container containing the cargo, the wireless tracking tag associated with a tracking identifier that uniquely identifies the wireless tracking tag. The system also includes a wireless monitoring device positioned to monitor a cargo hold of the transport vehicle. The wireless monitoring device has a wireless communications interface, a processor, and a memory communicatively coupled with the processor and storing: a device identifier that uniquely identifies the wireless monitoring device; a manifest including tracking identifiers corresponding to wireless tracking tags attached to logistic containers expected to be loaded onto the transport vehicle; and firmware. The firmware has machine-readable instructions that, when executed by the processor, cause the processor to: receive, using the wireless communication interface, the tracking identifier from the wireless tracking tag; and identify a discrepancy when the tracking identifier is not listed in the manifest.

In another embodiment, a wireless tracking tag includes: a battery; an Automatic Dependent Surveillance-Broadcast (ADS-B) out receiver implementing a first wireless communication protocol; a processor; and memory storing machine-readable instructions that, when executed by the processor, cause the processor to: control the ADS-B out receiver to (a) receive a first ADS-B out signal transmitted by a first transport vehicle, (b) receive a second ADS-B out signal transmitted by a second transport vehicle, different from the first transport vehicle, and (c) receive a third ADS-B out signal transmitted by a third transport vehicle, different from both the first transport vehicle and the second transport vehicle. The machine-readable instructions, when executed by the processor, also cause the processor to: estimate a current location of the wireless tracking tag based on locations defined in at least one of the first ADS-B out signal, the second ADS-B out signal, and the third ADS-B out signal.

In another embodiment, a monitoring device includes an RF transceiver implementing a first wireless communication protocol; a processor; and memory storing machine-readable instructions. The machine-readable instructions, when executed by the processor, cause the processor to: receive a wireless signal containing a tracking identifier from a wireless tracking tag attached to a logistic container being conveyed into a cargo hold of a transport vehicle; determine a signal strength of the wireless signal; and transmit an alert to a network service when the signal strength indicates that the wireless tracking tag was not loaded into the cargo hold of the transport vehicle.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," and "unit" refer to hardware, software, or firmware, or a combination thereof.

Exemplary Tape Agents

The instant specification describes an example system of tape agent platforms (also referred to herein as "tape agents") that can be used to implement a low-cost wireless network infrastructure for performing monitoring, tracking, and other logistic functions relating to, for example, parcels, persons, tools, equipment and other physical assets and objects. The tape nodes discussed herein include the features described in U.S. Pat. No. 10,455,634, titled "Fabricating Multifunction Adhesive Product for Ubiquitous Realtime Tracking", and U.S. Patent Application Publication Number 2019/0272458, titled "Wireless Communications and Transducer Based Event Detection Platform"; each of the aforementioned patent and patent application publication are incorporated by reference in their entireties as if fully set forth herein. The example system includes a set of four different types of tape nodes that have different respective functionalities and different respective cover markings that visually distinguish the different tape agent types from one another. Other systems may include fewer than three or more than three different types of tape nodes. In one non-limiting example, the covers of the different tape agent types are marked with different colors (e.g., white, green, and black). In the illustrated examples, the different tape agent types also are distinguishable from one another by their respective wireless communications capabilities and their respective sensing capabilities. The colors discussed above are examples only, any different color, or any combination of colors may be used, for any different categories of tape nodes.

Figure 1A:
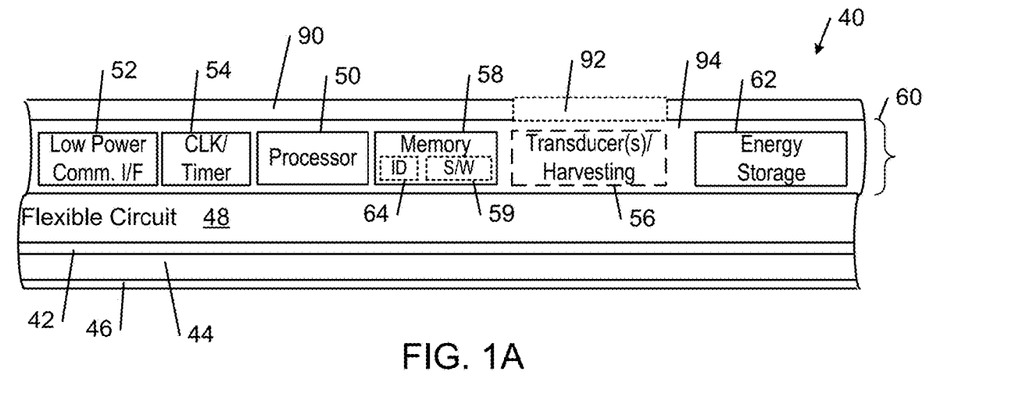
FIGS. 1A-1D show diagrammatic cross-sectional side views of portions of different respective autonomous agent tape platforms.

FIG. 1A is a cross-sectional side view of one example first type (e.g., white) of tape node 40 formed as a segment of a flexible adhesive tape product. The first type of tape node 40 includes an adhesive layer 42, an optional flexible substrate 44 (e.g., a polymer layer), and an optional adhesive layer 46 on the bottom surface of the flexible substrate 44. If the bottom adhesive layer 46 is present, a release liner (not shown) may be (removably) adhered to the bottom surface of the adhesive layer 46. In some examples, the adhesive layer 46 includes an adhesive (e.g., an acrylic foam adhesive) that has a high bond strength that is sufficient to prevent removal of the first type of tape node 40 from a surface on which the adhesive layer 46 is adhered without destroying the physical or mechanical integrity of the first type of tape node 40 and/or one or more of its constituent components. In some examples, the optional flexible substrate 44 is implemented as a prefabricated adhesive tape that includes the adhesive layers 42, 46 and the optional release liner. In other examples, the adhesive layers 42, 46 are applied to the top and bottom surfaces of the flexible substrate 44 during the fabrication of the adhesive tape platform. The adhesive layer 42 bonds the flexible substrate 44 to a bottom surface of a flexible circuit 48, that includes one or more wiring layers (not shown) that connect the processor 50, a low power wireless communication interface 52 (e.g., a Zigbee, Bluetooth® Low Energy (BLE) interface, or other low power communication interface), a clock and/or a timer circuit 54, transducing and/or energy harvesting component(s) 56 (if present), the memory 58, and other components in a device layer 60 to each other and to the energy storage device 62 and, thereby, enable the transducing, tracking and other functionalities of the first type of tape node 40. The memory 58 may store a device identifier (ID) 64 that uniquely identifies the tape node 40, and software 59 that includes machine-readable instructions that are executable by the processor 50 to cause the processor to implement functionality described herein. The low power wireless communication interface 52 typically includes an antenna and a wireless circuit.

Figure 1B:
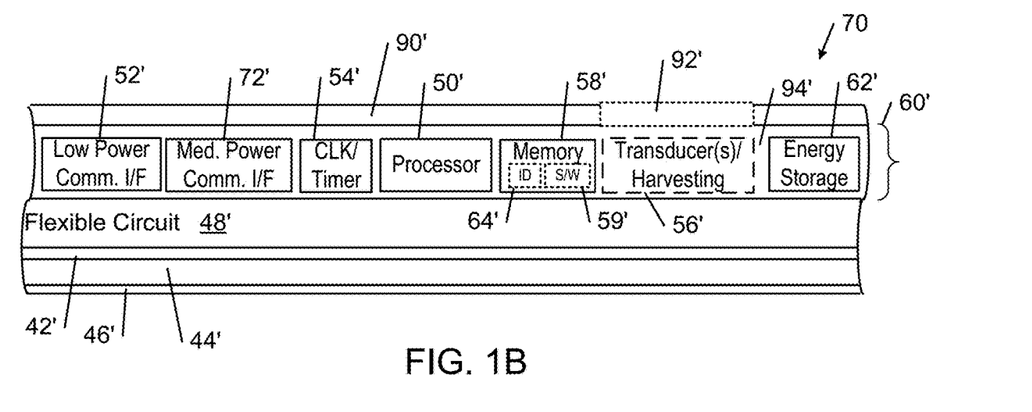

FIG. 1B shows a cross-sectional side view of a portion of an example second type (e.g., green) of tape node 70 formed as a segment of a flexible adhesive tape product. The second type of tape node 70 is similar to the first type of tape node 40 shown in FIG. 1A, but differs by the inclusion of a medium power communication interface 72' (e.g., a LoRa interface) in addition to the low power communications interface 52' that is present in the first type of tape node 40. The medium power communication interface 72' has longer communication range than the low power communication interface 52'. In some examples, one or more other components of the second type of tape node 70 differ from components of the first type of tape node 40 in functionality or capacity (e.g., larger power source).

Figure 1C:
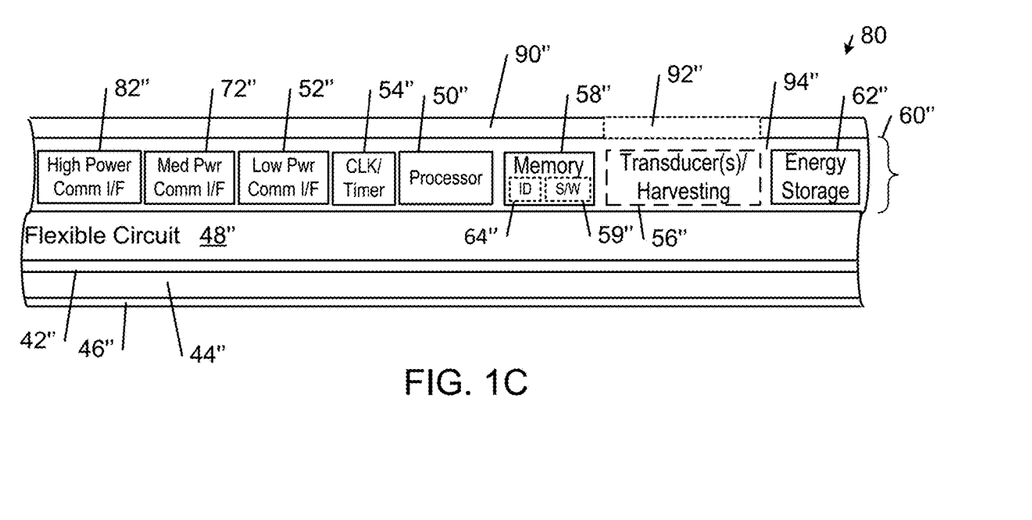

FIG. 1C shows a cross-sectional side view of a portion of an example third type (e.g., black) of tape node 80 formed as a segment of a flexible adhesive tape product. The third type of tape node 80 is similar to the second type of tape node 70 of FIG. 1B, but differs by further including a high-power communications interface 82" (e.g., a cellular interface; e.g., GSM/GPRS). The high-power communication range of the high-power communications interface 82'" provides global coverage to available infrastructure (e.g. the cellular network). In certain embodiments, one or more other components of the third type of tape node 80 differ from those of the second type of tape node 70 in functionality or capacity (e.g., larger energy source).

Figure 1D:
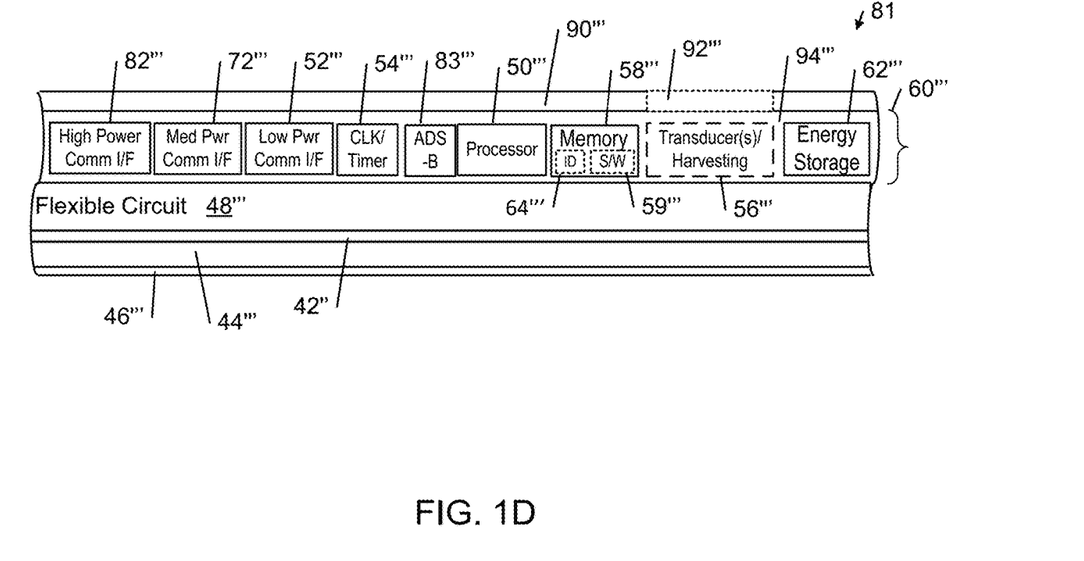

FIG. 1D shows a cross-sectional side view of a portion of an example fourth type (e.g., black) of tape node 81 formed as a segment of a flexible adhesive tape product. The fourth type of tape node 81 is similar to the third type of tape node 80 but differs by further including an Automatic Dependent Surveillance-Broadcast (ADS-B) out receiver 83'" for receiving ADS-B out signals from aircraft, other vehicles, items, and objects. For example, each ADS-B out signal defines a current location (e.g., based on GNSS determined coordinates) of an identified transport vehicle (e.g., an aircraft).

FIGS. 1A-1D show examples in which the cover 90, 90', 90", 90'" (e.g., a flexible layer) of the flexible adhesive tape platform includes one or more interfacial regions 92, 92', 92", 92'" positioned over one or more of the transducers 56, 56', 56", 56'". In examples, one or more of the interfacial regions 92, 92', 92", 92'" have features, properties, compositions, dimensions, and/or characteristics that are designed to improve the operating performance of the platform for specific applications. In some examples, the flexible adhesive tape platform includes multiple interfacial regions 92, 92', 92", 92'" over respective transducers 56, 56', 56", 56'", which may be the same or different depending on the target applications. Example interfacial regions include an opening, an optically transparent window, and/or a membrane located in the interfacial regions 92, 92', 92", 92'" of the cover 90, 90', 90", 90'" that is positioned over the one or more transducers and/or energy harvesting components 56. Additional details regarding the structure and operation of example interfacial regions 92, 92', 92", 92'" are described in U.S. patent application Ser. No. 16/430,929, filed Jun. 4, 2019, and U.S. patent application Ser. No. 16/409,589, filed May 10, 2019, each of which are incorporated herein by reference in their entireties as if fully set forth.

In some examples, a flexible polymer layer 94, 94', 94", 94'" encapsulates the device layer 60 and thereby reduces the risk of damage that may result from the intrusion of contaminants and/or liquids (e.g., water) into the device layer 60, 60', 60", 60'". The flexible polymer layer 94, 94', 94", 94'" also planarizes the device layer 60. This facilitates optional stacking of additional layers on the device layer 60, 60', 60", 60'" and also distributes forces generated in, on, or across the tape nodes 40, 70, 80 so as to reduce potentially damaging asymmetric stresses that might be caused by the application of bending, torqueing, pressing, or other forces that may be applied to the tape nodes 40, 70, 80 during use. In the illustrated example, a cover 90, 90', 90", 90'" is bonded to the planarizing flexible polymer layer 94, 94', 94", 94'" by an adhesive layer (not shown).

The cover 90, 90', 90', 90"" and the flexible substrate 110 may have the same or different compositions depending on the intended application. In some examples, one or both of the cover 90, 90', 90", 90'" and the flexible substrate 44, 44', 44", 44'" include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the cover 90, 90', 90", 90'" and the adhesive layers 42, 42', 42", 46, 46', 46", 46'" on the top and bottom surfaces of the flexible substrate 44, 44', 44" typically include a pressure-sensitive adhesive (e.g., a silicon-based adhesive). In some examples, the adhesive layers are applied to the cover 90 and the flexible substrate 44, 44', 44", 44'" during manufacture of the adhesive tape platform (e.g., during a roll-to-roll or sheet-to-sheet fabrication process). In other examples, the cover 90, 90', 90" may be implemented by a prefabricated single-sided pressure-sensitive adhesive tape and the flexible substrate 44 may be implemented by a prefabricated double-sided pressure-sensitive adhesive tape; both kinds of tape may be readily incorporated into a roll-to-roll or sheet-to-sheet fabrication process. In some examples, the flexible substrate 44, 44', 44", 44'" is composed of a flexible epoxy (e.g., silicone).

In some examples, the energy storage device 62, 62', 62', 62"" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 52, 52', 52", 52'" and/or the processor(s) 50, 50', 50", 50'" may be integrated on the flexible battery substrate. In some examples, one or more of such components also (e.g., the flexible antennas and the flexible interconnect circuits) may be printed on the flexible battery substrate.

Tape nodes 40, 70, 80, and 81 may establish communication with the same type of tape node, and with other types of tape node. For example, a first tape node may broadcast advertisement packets in accordance with a particular wireless communication protocol such that they may be received by other tape nodes. When a second tape node receives one of the advertisement packets, the second tape node may transmit a scan link request. In response to the scan link request, the first tape node may establish a communication link with the second tape node (e.g., by allocating a data channel).

EXAMPLE EMBODIMENTS

Figure 2A:
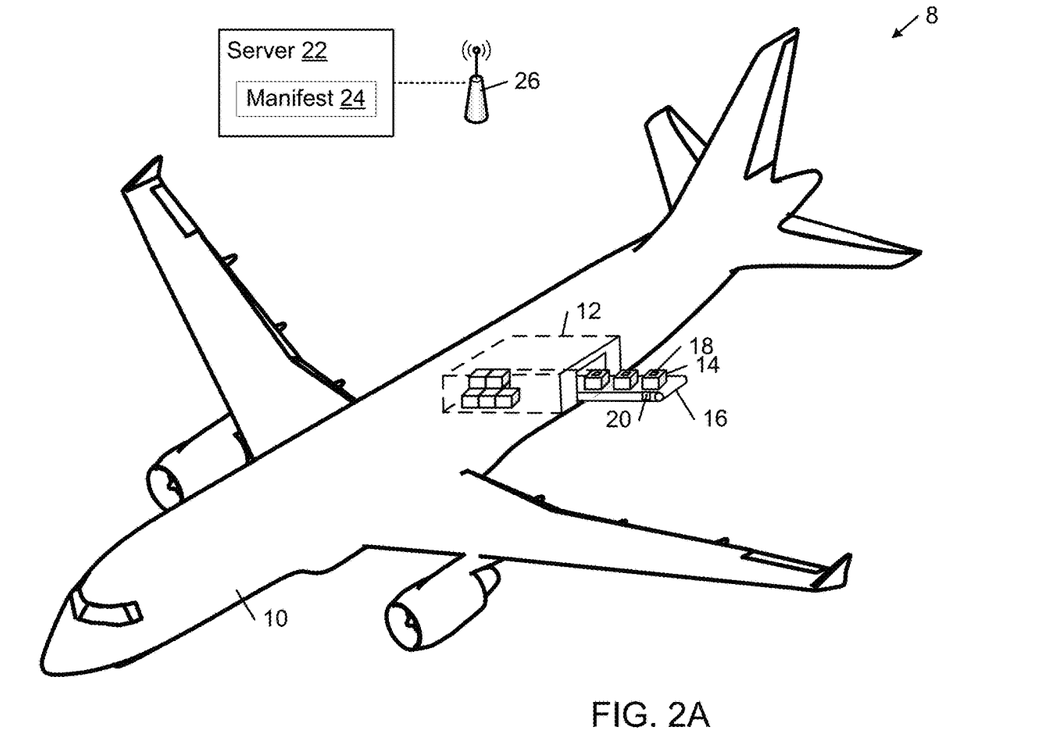
FIG. 2A is a diagrammatic view of a transport vehicle being loaded with cargo, in embodiments.

FIG. 2A is a schematic diagram illustrating one example system 8 for monitoring loading of assets in logistic containers 14 (e.g., cargo) onto a transport vehicle 10. In the example of FIG. 2A, the transport vehicle 10 is an aircraft; however, transport vehicle 10 may represent other types of transportation including ground vehicles, trucks, trains, water vehicles, ships, air vehicles, and any other vehicle used to transport freight or cargo. The logistic container 14 may represent any type of asset (e.g., object(s), item(s), cargo, etc.), or container thereof, being transported. For example, logistic container 14 may represent one or more of a package, a parcel, a box, and a unit load device.

Figure 2B:
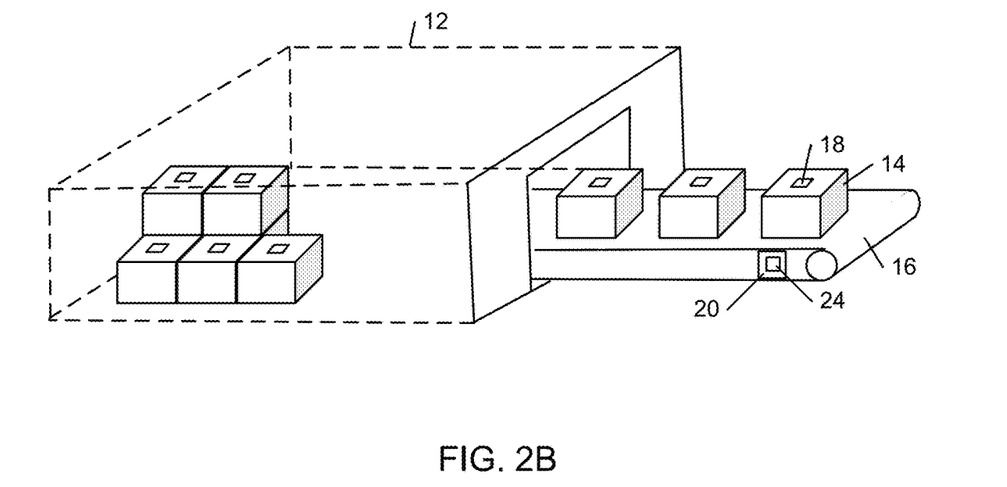
FIG. 2B is a diagrammatic view of a conveyor system loading assets and/or logistic containers into a cargo hold, in embodiments.

The transport vehicle 10 includes a cargo hold 12 into which the logistic containers 14 are loaded by a cargo loader 16, such as a conveyer device for example, through an access port (e.g., a door or hatch). Each logistic container 14 has at least one wireless tracking tag 18, which may be implemented as one of the first, second, third and fourth types of tape node 40, 70, 80, and 81 of FIGS. 1A, 1B, 1C, and 1D, respectively, and may take the form of a tag, tape, and/or label. For purpose of illustration, wireless tracking tag 18 is assumed to represent tape node 40 of FIG. 1A. FIG. 2B is an enlarged view of the cargo hold 12, the cargo loader 16, the logistic containers 14, the wireless tracking tags 18, and the wireless monitoring device 20. FIGS. 2A and 2B are best viewed together with the following description.

The wireless tracking tag 18 is a digital computing device that includes energy storage 62 (e.g., a battery), processor 50, memory 58 that includes software 59 (e.g., machine-readable instructions) and a tracking identifier 64 that uniquely identifies the wireless tracking tag 18, and a wireless communications interface 52.

The system 8 also includes a server 22, such as a cloud based computer server that is remote from the wireless monitoring device 20, that communicates with the wireless monitoring device 20 over a wireless network 26 (e.g., a local WAN, the Internet, etc.). Server 22 may represent the example computer apparatus 420 shown in FIG. 9. The server 22 may include a manifest 24 that may be represented as a table (e.g., stored as data 446 of memory 424) or a list that defines, for each logistic contains scheduled to be conveyed to the cargo hold 12 of the transport vehicle 10 and fitted with at least one wireless tracking tag 18, the corresponding tracking identifier of the at least one wireless tracking tag 18.

The wireless monitoring device 20 is a digital computing device. In certain embodiments, wireless monitoring device 20 may be implemented as one of the first, second, third and fourth types of tape node 40, 70, 80, and 81 of FIGS. 1A, 1B, 1C, and 1D, respectively, and may take the form of a tag, tape, and/or label. However, wireless monitoring device 20 may take other forms and be based on other similar devices without departing from the scope hereof. For purpose of illustration, wireless monitoring device 20 is assumed to represent the third type of tape node 80 of FIG. 1C and includes energy storage 62" (e.g., a battery), processor 50", memory 58" that includes software 59" (e.g., machine-readable instructions) and monitoring device identifier 64" that uniquely identifies the wireless monitoring device 20, and one or more wireless communications interfaces 52", 72", and 82".

In one example of operation, the wireless monitoring device 20 may determine its current location and send it to the server 22. In response, the server 22 may determine a closest transport vehicle 10 to the wireless monitoring device 20, and then send one or both of a unique universal identifier (UUID) of the transport vehicle 10 (e.g., a unique international Civil Aviation Organization address that uniquely identifies the aircraft), and the manifest 24. The wireless monitoring device 20 may receive, via the network 26, the UUID and/or the manifest 24 from the server 22 and store the UUID and/or the manifest 24 in its memory, such that the wireless monitoring device 20 is configured with the manifest 24 prior to loading of the logistic containers 14 into the cargo hold 12.

In certain embodiments, where the wireless monitoring device 20 is positioned within a cargo hold 12 of the transport vehicle 10, the wireless monitoring device 20 may broadcast a beacon signal, at intervals, that includes the UUID of the transport vehicle, such that any wireless tracking tags 18 within the cargo hold 12 may determine whether they are on the correct transport vehicle. For example, at least one wireless tracking tag 18 may be preconfigured with the UUID of the transport vehicle that it is intended to travel on, and may thereby determine whether it is on the correct transport vehicle by comparing the UUID received in the beacon signal to the UUID stored in its memory, generating an alert when the UUIDs do not match.

Figure 3:
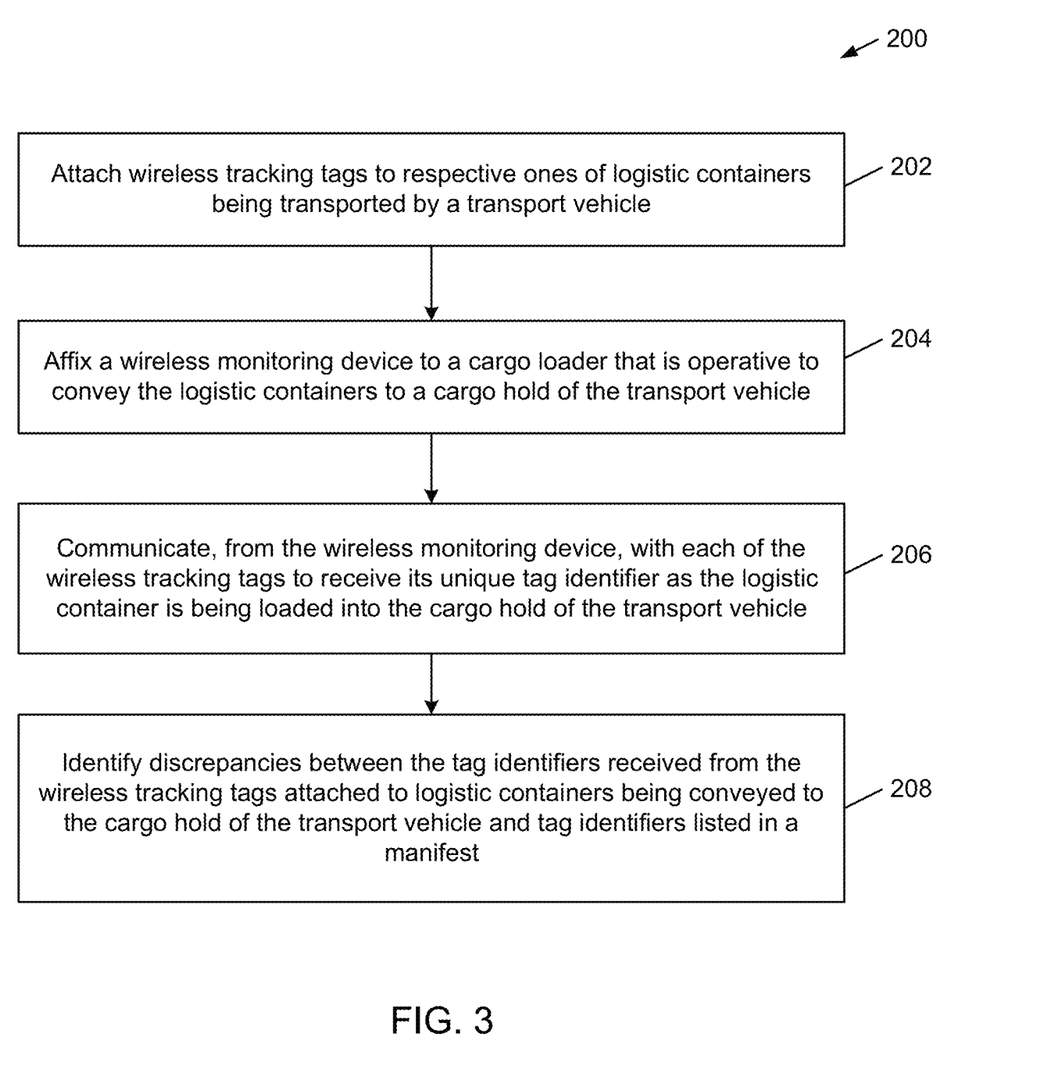
FIG. 3 is a flowchart illustrating one example method of loading assets/cargo onto a transport vehicle, in embodiments.

FIG. 3 is a flowchart illustrating one example method 200 for installing and operating at least part of the system 8 of FIGS. 2A and 2B. Block 206 and 208 of method 200 are implemented within the wireless monitoring device 20, for example. Wireless tracking tags 18 are attached to respective ones of logistic containers 14 intended for transport by the transport vehicle (FIG. 3, block 202). In one example of block 202, one wireless tracking tag 18 is attached to each logistic container 14 prior to loading the logistic containers 14 into the cargo hold 12. In another example of block 202, one wireless tracking tag 18 is attached to one logistic container 14 of a group of logistic containers (e.g., not all logistic containers ha a wireless tracking tag) prior to loading the logistic containers 14 into the cargo hold 12. In another example of block 202, the wireless tracking tags 18 are distributed randomly among the logistic containers 14 prior to loading the logistic containers 14 into the cargo hold 12.

The wireless monitoring device 20 is affixed to a structural, non-moving portion, of the cargo loader 16 (FIG. 3, block 204). In one example of block 204, the wireless monitoring device 20 is attached to a non-moving portion of the cargo loader 16 that is proximate the path of the logistic containers 14 as they are being loaded into the cargo hold 12.

In one example of operation, the wireless monitoring device 20 communicates with each of the wireless tracking tags 18 as it is loaded into the cargo hold 12 and receives the corresponding tracking identifier 64 of the wireless tracking tag 18 (FIG. 3, block 206). The wireless monitoring device 20 identifies discrepancies between the tracking identifiers received from the wireless tracking tags 18 attached to the logistic containers 14 being conveyed to the cargo hold 12 of the transport vehicle 10 and the tracking identifiers listed in the manifest 24 to determine discrepancies between the cargo expected to be loaded and the cargo actually loaded (FIG. 3, block 208). In one example, where the manifest 24 lists tracking identifier "T24" as expected to be loaded into cargo hold 12, and, when loading is complete, the tracking identifier "T24" was not received by the wireless monitoring device 20, the wireless monitoring device 20 determines that the logistic container 14 corresponding to the wireless tracking tag 18 with the tracking identifier "T24" was not loaded and is therefore a discrepancy. In another example, where the manifest 24 does not list tracking identifier "T87" as expected to be loaded into cargo hold 12, and, when the wireless monitoring device 20 receives the tracking identifier "T87" from one wireless tracking tag 18 as it is conveyed into the cargo hold 12, the wireless monitoring device 20 determines that the logistic container 14 corresponding to the wireless tracking tag 18 with the tracking identifier "T87" was loaded in error and is therefore a discrepancy.

In some embodiments, a distance of a wireless tracking tag 18 relative to the wireless monitoring device 20 is estimated based on a signal strength of a communication link (e.g., a Bluetooth communication connection) between the wireless monitoring device 20 and the wireless tracking tag 18. In the example of FIG. 2A, as the asset 14 with the wireless tracking tag 18 is conveyed into the cargo hold 12, the signal strength of wireless signals received via the communication link between the wireless tracking tag 18 and the wireless monitoring device 20 reduces. Accordingly, the system 8 (e.g., the wireless monitoring device 20) determines that the asset 14 with the attached wireless tracking tag 18 is being conveyed to the cargo hold 12 based on the known location of the wireless monitoring device 20 and the trend of the signal strength over time. In another example, the system 8 (e.g., one of the wireless monitoring device 20 and the wireless tracking tag 18 attached to the asset 14) may determine that an error or deviation in the loading of the asset 14 with the attached wireless tracking tag 18 has occurred when the signal strength abruptly decreases or abruptly increases. An abrupt increase or decrease may be different based on the given application, but those of skill in the art understand that "abrupt" is defined by a change over a predefined threshold that is representative of the asset 14 not being conveyed into the cargo hold. The system 8 (e.g., one of the wireless monitoring device 20, the wireless tracking tag 18, another tape node forming the system 8, or some combination thereof) may initiate an alert when the error or deviation is detected. For example, the wireless monitoring device 20 may detect an abrupt increase in the signal strength indicative of the asset 14 falling off the cargo loader 16 and landing in a location closer to the wireless monitoring device 20 than its previous position on the cargo loader 16. The wireless monitoring device 20 may broadcast an alert to other nodes forming the system 8 (e.g., another wireless tracking tag 18, another wireless monitoring device 20, a client device, a smartphone or device of a human operator, and/or the server 22). In some embodiments, the wireless monitoring device 20 broadcasts an audio alert to notify any nearby human operators.

Figure 4:
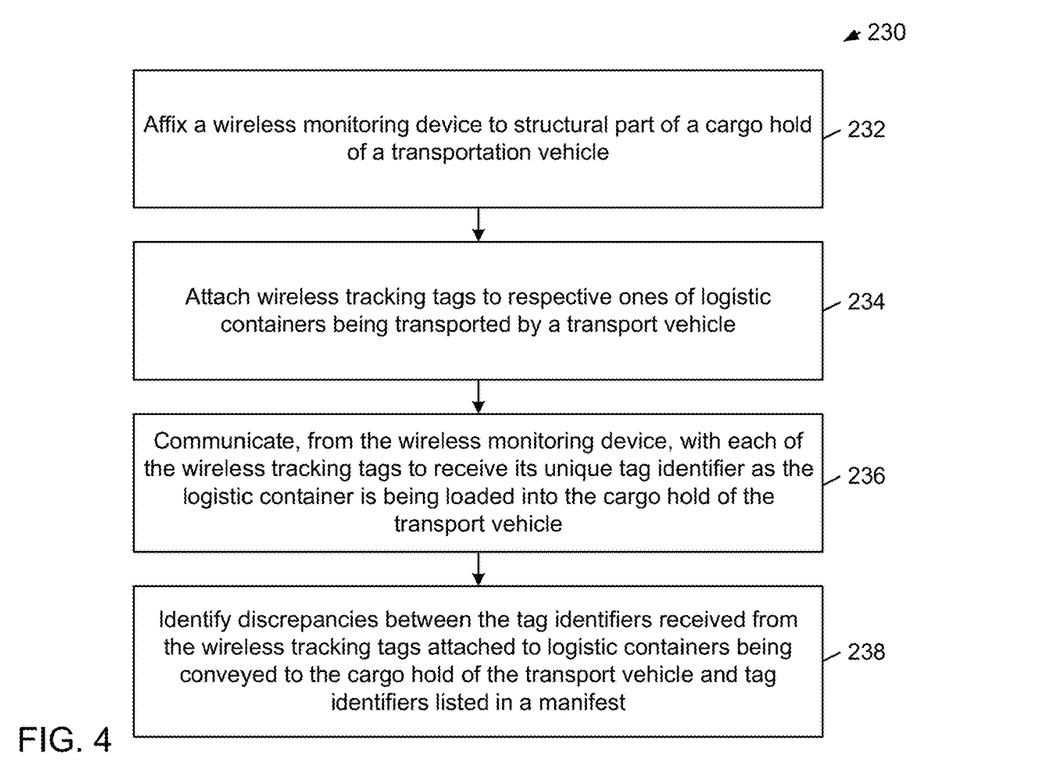
FIG. 4 is a flowchart illustrating one example method of loading cargo onto a transport vehicle, in embodiments.

FIG. 4 is a flowchart illustrating one example method 230 installing and operating at least part of the system 8 of FIGS. 2A and 2B. Blocks 236 and 238 of method 230 are implemented in wireless monitoring device 20, for example. A wireless monitoring device is affixed to a structural portion (e.g., a stationary portion, non-moving portion, such as the ceiling, wall, door frame, etc.) of a cargo hold of a transport vehicle (FIG. 4, block 232). In one example of block 232, wireless monitoring device 20 is attached to an internal ceiling of the cargo hold 12. In another example of block 232, wireless monitoring device 20 is attached to a door post of the cargo hold 12. The wireless monitoring device 20 may be an embodiment of a tape node, for example, one of tape nodes 40, 70, 80, 81 shown in FIGS. 1A-1D, according to some embodiments.

Wireless tracking tags 18 are attached to respective logistic containers 14 intended for transport by a transport vehicle 10 (FIG. 4, block 234). In one example of block 234, one wireless tracking tag 18 is attached to each logistic container 14 prior to loading the logistic containers 14 into the cargo hold 12. In another example of block 234, one wireless tracking tag 18 is attached to one logistic container 14 of a group of logistic containers (e.g., not all logistic containers ha a wireless tracking tag) prior to loading the logistic containers 14 into the cargo hold 12. In another example of block 234, the wireless tracking tags 18 are distributed randomly among the logistic containers 14 prior to loading the logistic containers 14 into the cargo hold 12.

In operation, the wireless monitoring device 20 communicates with each of the wireless tracking tags 18 as it is loaded into the cargo hold 12 and received the corresponding tracking identifier of the wireless tracking tag 18 (FIG. 4, block 236). The wireless monitoring device 20 identifies discrepancies between the tracking identifiers received from the wireless tracking tags 18 attached to the logistic containers 14 being conveyed to the cargo hold 12 of the transport vehicle 10 and the tracking identifiers listed in the manifest 24 to determine discrepancies between the cargo expected to be loaded and the cargo actually loaded (FIG. 4, block 238). In one example, where the manifest 24 lists tracking identifier "T24" as expected to be loaded into cargo hold 12, and, when loading is complete, the tracking identifier "T24" was not received by the wireless monitoring device 20, the wireless monitoring device 20 determines that the logistic container 14 corresponding to the wireless tracking tag 18 with the tracking identifier "T24" was not loaded and is therefore a discrepancy. In another example, where the manifest 24 does not list tracking identifier "T87" as expected to be loaded into cargo hold 12, and, when the wireless monitoring device 20 receives the tracking identifier "T87" from one wireless tracking tag 18 as it is conveyed into the cargo hold 12, the wireless monitoring device 20 determines that the logistic container 14 corresponding to the wireless tracking tag 18 with the tracking identifier "T87" was loaded in error and is therefore a discrepancy.

Figure 5:
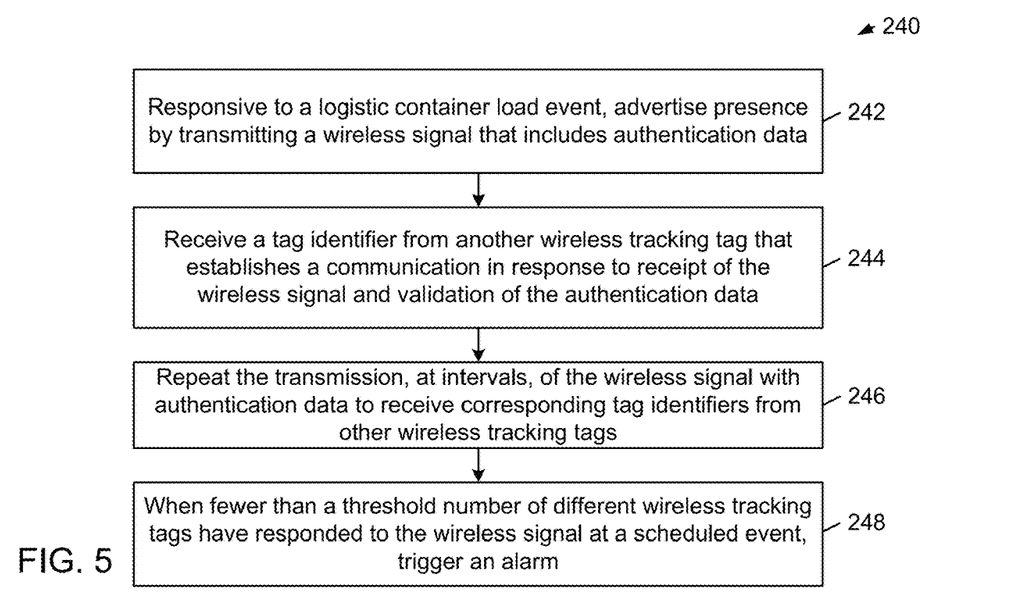
FIG. 5 is a flowchart illustrating one example method of confirming that a set of assets and/or logistic containers containing the assets are loaded on the correct transport vehicle.

FIG. 5 is a flowchart illustrating one example method 240 for monitoring a shipment that uses a plurality of logistic containers 14 that are being transported in a cargo hold 12 of a transport vehicle 10. Method 240 is implemented in at least one wireless tracking tag 18, for example. Method 240 may also be implemented by more than one wireless tracking tag, using distributed processing, for example. Method 240 may also be implemented by the wireless monitoring device 20, such as when the wireless monitoring device 20 is within the cargo hold 12.

In one example scenario, wireless tracking tags 18 are used by the transportation company to track logistic containers 14. In another example scenario, wireless tracking tags 18 are used by the company making a shipment and may be attached to each package in the company's shipment. For each scenario, operation of the wireless tracking tags 18 is similar, and is described below in detail. In this example, the wireless tracking tag 18 performing method 240 is referred to as the first wireless tracking tag 18 to distinguish it from other wireless tracking tags for clarity of description; however, any of the wireless tracking tags 18 conveyed into the cargo hold 12 may perform the method 240, and thus the method 240 may be performed by multiple wireless tracking tags 18, at different times and/or concurrently. Each wireless tracking tag 18 attached to logistic containers 14 being shipped together, or attached to packages being shipped together, may be configured with a threshold number that defines the total number of wireless tracking tags 18 used for that collective shipment, and may also be configured with a date and time that defines a scheduled event of interest, such as a time related to the departure of the transport vehicle 10 (e.g., 15 minutes before the scheduled departure time). Advantageously, each wireless tracking tag 18 may perform method 240 to determine when to trigger an alarm. In certain embodiments, each wireless tracking tag 18 attached to assets of a collective shipment may be configured with a group manifest that identifies each of the wireless tracking tags in the collective shipment. Particularly, one or more of the wireless tracking tags 18 may then determine when any one, or more, of the wireless tracking tags 18 in the group manifest cannot be contacted, indicating that the corresponding asset may be missing.

The first wireless tracking tag 18 may identify a logistic container load event by determining that it has been loaded into the cargo hold 12 of the transport vehicle 10. For example, based upon interrogation by wireless monitoring device 20, the first wireless tracking tag 18 may determine that is has been conveyed into the cargo hold 12. In response to the logistic container load event, the first wireless tracking tag 18 may indicate its presence by transmitting, at intervals, a wireless signal (e.g., a broadcast advertisement packet) that includes authentication data (FIG. 5, block 242). In certain embodiments, the wireless tracking tag 18 may use a different wireless protocol (e.g., a short-range protocol, such as Bluetooth). Other wireless tracking tags 18 (or the wireless monitoring device 20) that are within wireless communication range of the first wireless tracking tag 18 may respond to receiving the wireless signal, when the authentication data is validated, by transmitting a scan link request to establish communication with the first wireless tracking tag 18, over a data channel for example. The authentication data may be determined as valid only when it matches authentication data preloaded into the other wireless tracking tag. When the wireless tracking tag 18 receiving the wireless signal cannot validate the authentication data, the wireless tracking tag 18 does not respond to the wireless signal. Advantageously, the authentication data may be selected to group the wireless tracking tags 18 according to the cargo being shipped, where the same authentication data is used by wireless tracking tags 18 of the same shipment. The first wireless tracking tag 18 may receive the tracking identifier of the other wireless tracking tag 18. (FIG. 5, block 244).

The first wireless tracking tag 18 repeats the transmission, at intervals, of the wireless signal with authentication data, to establish communications connections with other wireless tracking tags 18 that are within wireless range, and to receive their corresponding tracking identifiers (FIG. 5, block 246).

In certain embodiments, each of the wireless tracking tags 18 transmits, at intervals, a wireless signal including its unique identifier and the authentication data. The first wireless tracking tag 18 tracks the different unique identifiers received in these wireless signals with validated authentication data to determine ones of the wireless signals that correspond to the same collective shipment. Over time, the first wireless tracking tag 18 learns the unique identifiers of the other wireless tracking tags 18 in proximity and may thereby determine, based on the group manifest, whether any assets of the collective shipment are missing.

When the first wireless tracking tag 18 determines that fewer than the threshold number of different wireless tracking tags have responded to the wireless signal at the scheduled event, the first wireless tracking tag 18 triggers an alarm (FIG. 5, block 248). In certain embodiments, the first wireless tracking tag 18 may detect when a particular one of the wireless tracking tags identified in the group manifest has not responded. In some embodiments, the wireless tracking tag 18 stores program instructions to trigger an alarm if the total number of other wires tags that accept the authentication credentials is less than the threshold number before the scheduled event occurs.

Figure 6:
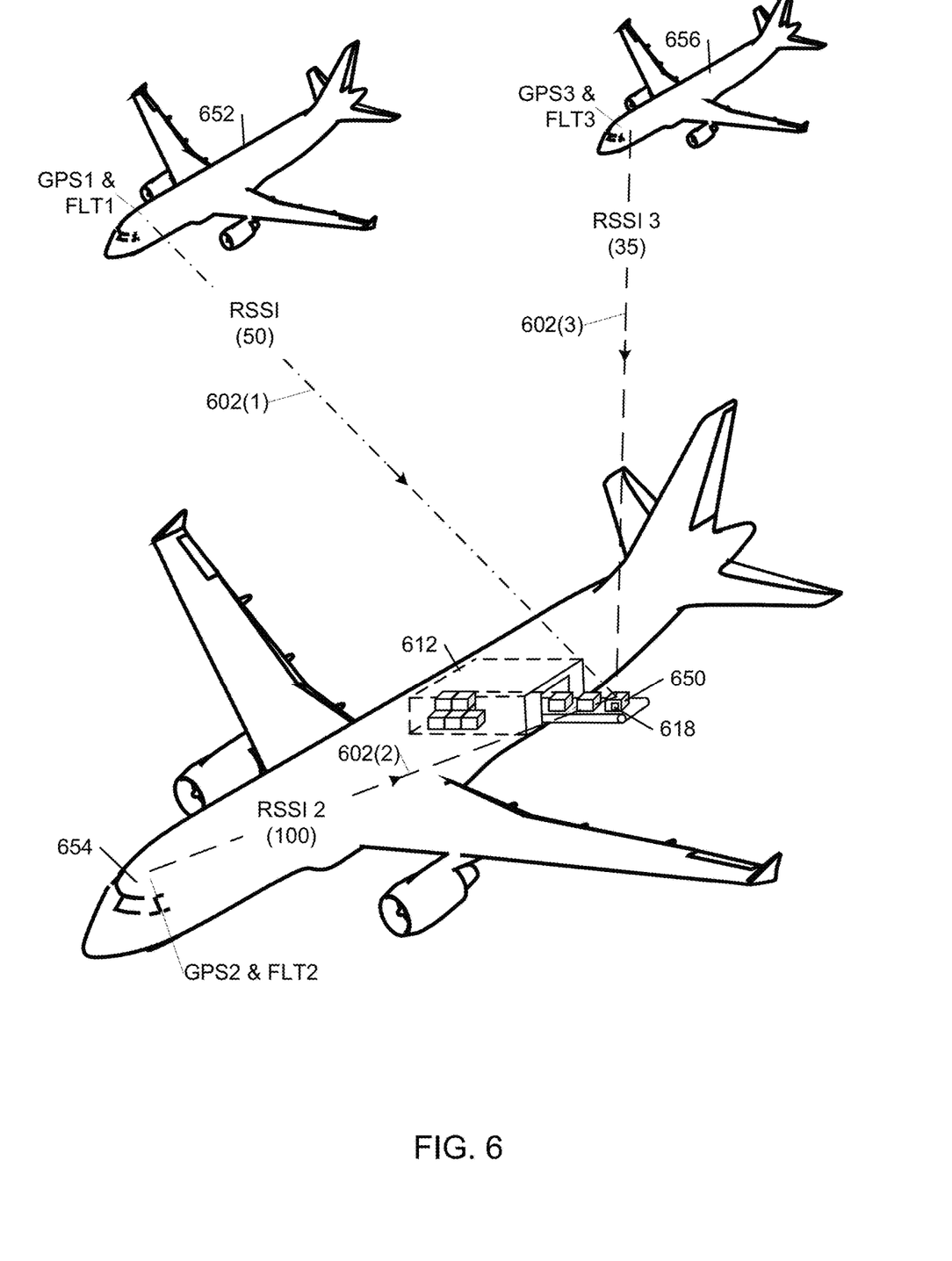
FIG. 6 is diagrammatic view illustrating use of one or more ADS-B signals to determine a current position of an asset and/or logistic container containing the asset.

FIG. 6 is a diagrammatic view illustrating the use of one or more ADS-B out signals 602 to determine a current position of a logistic container 650. In this embodiment, a wireless tracking tag 618 is attached to the logistic container 650 and represents the fourth type of tape node 81 of FIG. 1D. In this example, the logistic container 650 is being loaded into a cargo hold 612 of an aircraft 654. Three ADS-B out signals 602(1)-(3) are transmitted by three different aircraft 652, 654, 656, respectively, each of which may be on the ground or in the air. Each of the ADS-B out signals 602(1)-(3) includes a current Global Navigation Satellite System (GNSS) determined location (e.g., geographic coordinates, height, etc.) and a unique identifier (e.g., a unique International Civil Aviation Organization address that uniquely identifies the aircraft), thereby defining a location of, and identifying, each of the corresponding aircraft 652, 654, 656. In the example of FIG. 6, the wireless tracking tag 618 receives three different ADS-B out signals 602(1)-(3) determining a current position (location) of the logistic container 650.

Figure 7:
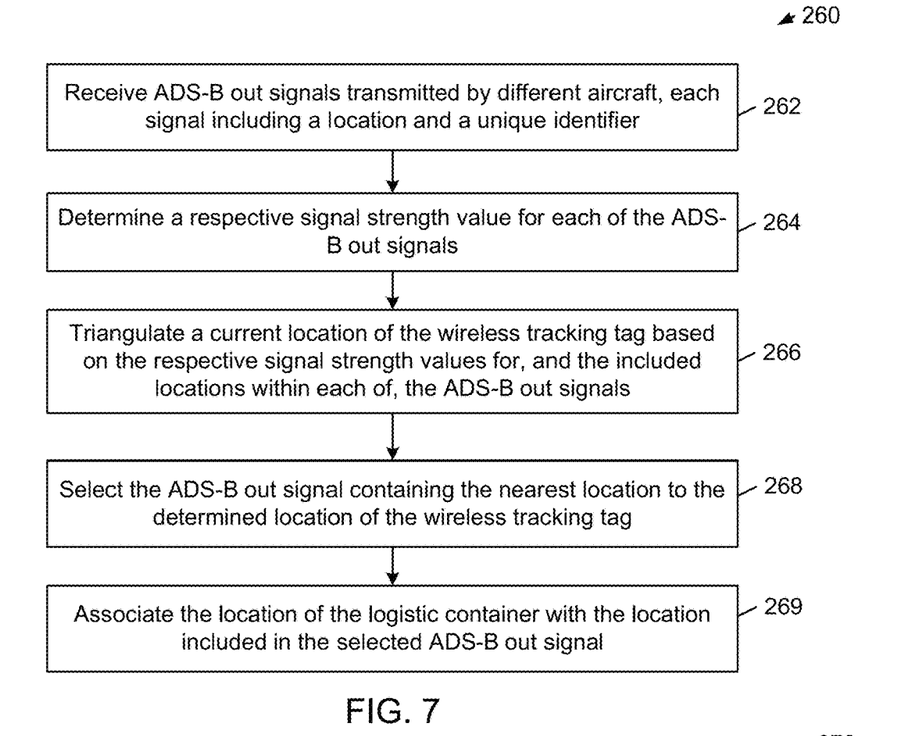
FIG. 7 is a flowchart illustrating one example method of determining Global Navigation Satellite System (GNSS) coordinates of an asset and/or a logistic container containing the asset.

FIG. 7 is a flowchart illustrating one example method 260 for determining the current position of the logistic container 650 of FIG. 6 by triangulating the received ADS-B out signals 602 and selecting one of the ADS-B out signals 602 that corresponds to the aircraft carrying the logistic container 650. Method 260 is implemented by the wireless tracking tag 618 affixed to the logistic container 650 for example. The wireless tracking tag 618 receives ADS-B out signals 602 transmitted by different aircraft, each signal defining a respective location and unique identifier (FIG. 7, block 262). In one example of block 262, the wireless tracking tag 618 receives ADS-B out signal 602(1) transmitted by aircraft 652, receives ADS-B out signal 602(2) transmitted by aircraft 654, and receives ADS-B out signal 602(3) transmitted by aircraft 654. A respective signal strength value is determined by the wireless tracking tag 618 for each of the ADS-B out signals 602 received (FIG. 7, block 264). In one example of block 264, ADS-B out receiver 83''' of the wireless tracking tag 618 determines a received signal strength indicator (RSSI) of the ADS-B out signal 602 as the signal is received. In other embodiments, the signal strength value for the ADS-B out signal 602 is determined by other components of the wireless tracking tag 618.

The wireless tracking tag 618 triangulates its current location based on both the corresponding signal strength values of each received ADS-B out signal 602 and the corresponding location included in the ADS-B out signal (FIG. 7, block 266). In one example of block 266, the wireless tracking tag 618 determines its current locations by triangulation using the signal strength values and locations of each aircraft 652, 654, and 656 determined from ADS-B out signals 602(1)-(3), respectively. The wireless tracking tag 618 selects the ADS-B out signal 602 containing the location that is nearest to the determined location of the wireless tracking tag 618 (FIG. 7, block 268). In one example of block 268, the wireless tracking tag 618 determines that the ADS-B out signal 602(2) includes the location that is nearest to the triangulated current location of the wireless tracking tag 618. Associate the location of the logistic container 650 with the location included in the selected ADS-B out signal (FIG. 7, block 269). In one example of block 269, the wireless tracking tag 618 uses the location received in ADS-B out signal 602(2) as the location of the logistic container 650.

Figure 8:
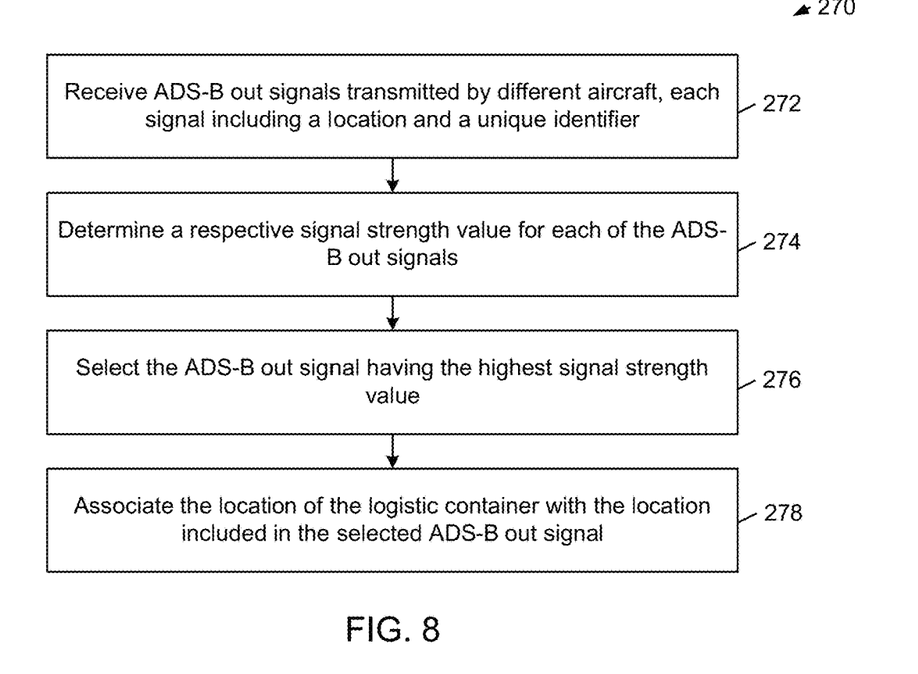
FIG. 8 is a flowchart illustrating one example method of selecting the GNSS coordinates of an asset and/or a logistics container containing the asset based on signal strength values received from different aircraft.

FIG. 8 is a flowchart illustrating one example method 270 for determining the current position of the logistic container 650 of FIG. 6 by selecting a one of the ADS-B out signals 602 that corresponds to the aircraft carrying the logistic container 650. Method 270 is implemented by the wireless tracking tag 618 affixed to the logistic container 650 for example. The wireless tracking tag 618 receives ADS-B out signals 602 transmitted by different aircraft, each signal defining a respective location and unique identifier (FIG. 8, block 272). In one example of block 272, the wireless tracking tag 618 receives ADS-B out signal 602(1) transmitted by aircraft 652, receives ADS-B out signal 602(2) transmitted by aircraft 654, and receives ADS-B out signal 602(3) transmitted by aircraft 654. A respective signal strength value is determined by the wireless tracking tag 618 for each of the ADS-B out signals 602 received (FIG. 8, block 274). The ADS-B out signal with the highest signal strength value is selected (FIG. 8, block 276). In one example of block 276, the wireless tracking tag 618 selects the ADS-B out signal 602(2) as having the strongest RSSI value, as compared to RSSI values for ADS-B out signals 602(1) and 602(3). Associate the location of the logistic container 650 with the location included in the selected ADS-B out signal (FIG. 8, block 278). In one example of block 278, the wireless tracking tag 618 determines that the logistic container 650 (and thus the wireless tracking tag 618) is being transported by the aircraft 654 and uses the location received in ADS-B out signal 602(2) as the location of the logistic container 650.

As described above, the wireless tracking tag 18 may triangulate its location from three different ADS-B out signals. The determines location thereby defines the location of the asset to which the wireless tracking tag 18 is attached. Prior to loading of the asset onto an aircraft, the determined location of the wireless tracking tag 18 may indicate when the asset is not near the aircraft designated for transporting the asset. For example, where the assets is designated for transport by transport vehicle 654 (FIG. 6), which is currently being loaded, and the determined location of the corresponding wireless tracking tag 18 indicates that the assets is no near to the aircraft, the system 8 may generate an alert. Advantageously, the use of triangulation may locate the asset (wireless tracking tag 18) prior to loading onto the aircraft which may identify incorrect loading before it occurs. In another example, the use of triangulation may define a location of the asset within the aircraft after loading. For example, the triangulated location may indicate which part of the plane, relative to the cockpit (or some other central location), the asset is in. In another example, the triangulated location may indicate that the asset is outside of the transportation vehicle 654, which is about to depart, the wireless tracking tag 18 may cause system 8 to generate an alert indicating that the asset has not been loaded as expected. Further, if the location of the asset is determined (by the wireless tracking tag 18) to be at the airport still, but the location of the transport vehicle expected to carry the asset has left the airport, system 8 may determine that the asset missed its flight.

Advantageously, the use of triangulation with the ADS-B out signals provides an additional metric to use of ADS-B out signal tracking of aircraft for improved tracking of assets and for identifying transportation anomalies.

Example Computer Apparatus

Figure 9:
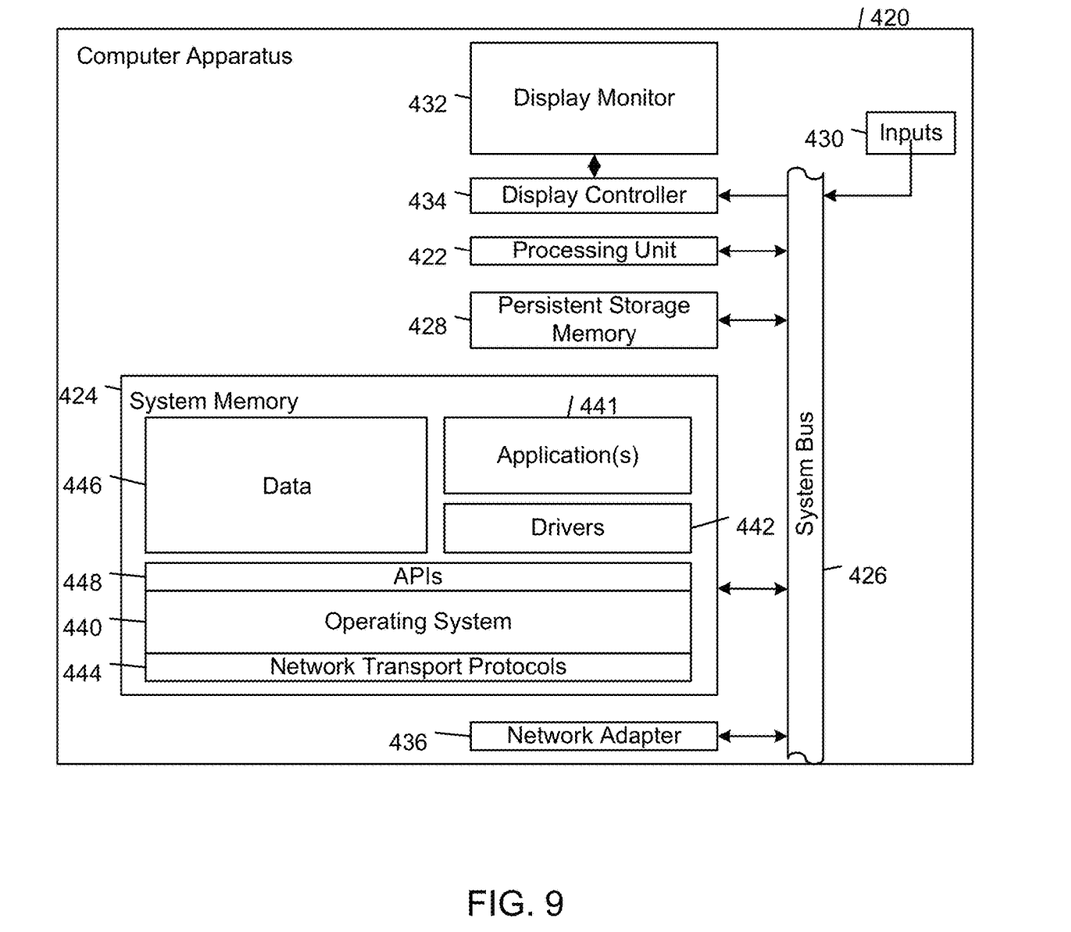
FIG. 9 is a block diagram of an example computer apparatus.

FIG. 9 shows an example embodiment of computer apparatus that may be used to implement one or more of the computing systems (e.g., server 22 of FIG. 2A) described in this specification. The computer apparatus 420 includes a processing unit 422, a system memory 424, and a system bus 426 that couples the processing unit 422 to the various components of the computer apparatus 420. The processing unit 422 may include one or more data processors, each of which may be in the form of any one of various commercially available computer processors. The system memory 424 includes one or more computer-readable media that typically are associated with a software application addressing space that defines the addresses that are available to software applications. The system memory 424 may include a read only memory (ROM) that stores a basic input/output system (BIOS) that contains start-up routines for the computer apparatus 420, and a random-access memory (RAM). The system bus 426 may be a memory bus, a peripheral bus or a local bus, and may be compatible with any of a variety of bus protocols, including PCI, VESA, Microchannel, ISA, and EISA. The computer apparatus 420 also includes a persistent storage memory 428 (e.g., a hard drive, a floppy drive, a CD ROM drive, magnetic tape drives, flash memory devices, and digital video disks) that is connected to the system bus 426 and contains one or more computer-readable media disks that provide non-volatile or persistent storage for data, data structures and computer-executable instructions.

A user may interact (e.g., input commands or data) with the computer apparatus 420 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 420 also may include other input/output hardware (e.g., peripheral output devices, such as speakers and a printer). The computer apparatus 420 connects to other network nodes through a network adapter 436 (also referred to as a "network interface card" or NIC).

A number of program modules may be stored in the system memory 424, including application programming interfaces 448 (APIs), an operating system (OS) 440 (e.g., the Windows® operating system available from Microsoft Corporation of Redmond, Wash. U.S.A.), software applications 441 including one or more software applications programming the computer apparatus 420 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A wireless tracking tag, comprising:
    a battery;
    an Automatic Dependent Surveillance-Broadcast (ADS-B) out receiver implementing a first wireless communication protocol;
    a processor; and memory storing machine-readable instructions that, when executed by the processor, cause the processor to:

control the ADS-B out receiver to (a) receive a first ADS-B out signal transmitted by a first transport vehicle, (b) receive a second ADS-B out signal transmitted by a second transport vehicle, different from the first transport vehicle, and (c) receive a third ADS-B out signal transmitted by a third transport vehicle, different from both the first transport vehicle and the second transport vehicle; and estimate a current location of the wireless tracking tag based on locations defined in at least one of the first ADS-B out signal, the second ADS-B out signal, and the third ADS-B out signal.

2. The wireless tracking tag of claim 1, the memory further comprising machine-readable instructions that, when executed by the processor, cause the processor to:

control the ADS-B out receiver to determine respective signal strengths of each of the first ADS-B out signal, the second ADS-B out signal, and the third ADS-B out signal; and triangulate the current location based on the respective signal strengths and the locations defined in each of the at least one of the first ADS-B out signal, the second ADS-B out signal, and the third ADS-B out signal.

3. The wireless tracking tag of claim 2, the memory further comprising machine-readable instructions that, when executed by the processor, cause the processor to:

associate, with the wireless tracking tag, a transport vehicle identifier received in one of the first ADS-B out signal, the second ADS-B out signal, and the third ADS-B out signal having the greatest signal strength; and determine a current location of the wireless tracking tag based on an updated location contained in each subsequently received ADS-B out signal containing the same transport vehicle identifier.

4. The wireless tracking tag of claim 3, the memory further comprising machine-readable instructions that, when executed by the processor, cause the processor to wirelessly transmit the transport vehicle identifier to a network service.

5. The wireless tracking tag of claim 1, further comprising an adhesive for adhering the wireless tracking tag to a logistic unit.

6. The wireless tracking tag of claim 5, the logistic unit comprising one or more of a parcel, a pallet, a container, and a unit load device (ULD).

7. The wireless tracking tag of claim 1, wherein each of the first transport vehicle, the second transport vehicle, and the third transport vehicle being selected from the group including an aircraft, a ground vehicle, and a water vehicle.

8. The wireless tracking tag of claim 1, the memory further comprising machine-readable instructions that, when executed by the processor, cause the processor to:

receive a beacon signal including a first universally unique identifier (UUID) that identifies the transport vehicle from a wireless monitoring device positioned in a cargo hold of the transport vehicle; and generating an alert when the UUID is different from a second UUID previously stored in the memory.

9. The wireless tracking tag of claim 1, further comprising an RF transceiver implementing a second wireless communication protocol, different form the first wireless communication protocol, the memory further comprising machine-readable instructions that, when executed by the processor, cause the processor to control the RF transceiver to communicate with one or more of another wireless tracking tag and a wireless monitoring device.

10. The wireless tracking tag of claim 9, the memory further comprising machine-readable instructions that, when executed by the processor, cause the processor to:

broadcast advertisement packets in accordance with the second wireless communication protocol;

receive a scan link request from at least one other wireless tracking tag; and establish a communications link with the other wireless tracking tag.

11. The wireless tracking tag of claim 9, wherein the wireless tracking tag is a flexible tape node formed as a segment of a flexible adhesive tape platform, the wireless tracking tag further comprising:

a flexible circuit having one or more electrical wiring layers for electrically coupling the battery, the ADS-B out receiver, the processor, and the memory;

an adhesive layer for attaching the wireless tracking tag to a logistic unit; and a flexible cover.

12. The wireless tracking tag of claim 9, the memory further comprising machine-readable instructions that, when executed by the processor, cause the processor to:

receive, from at least one other wireless tracking tag located in a cargo hold of a transport vehicle containing the wireless tracking tag, at least one other tracking identifier that uniquely identifies the at least one other wireless tracking tag;

determine a count of the at least one other wireless tracking tags within the cargo hold based on the at least one other tracking identifier;

generating an alert when the count is less than a target threshold number; and wherein the memory stores the target threshold number corresponding to a number of logistic units being transported by the transport vehicle.

13. The wireless tracking tag of claim 1, wherein the wireless tracking tag is configured to determine that the estimated location of the wireless tracking tag is different from an expected location of the wireless tracking tag.

14. The wireless tracking tag of claim 1, wherein the wireless tracking tag is associated with an asset, and the expected location corresponds to a transport vehicle that the asset is expected to be loaded onto.

15. The wireless tracking tag of claim 14, further comprising an RF transceiver implementing a second wireless communication protocol, wherein the wireless tracking tag is configured to wirelessly communicate with a wireless monitoring device to generate an alert in a tracking system associated with the wireless monitoring device.

16. A method comprising:

receiving, by a wireless tracking tag, a first Automatic Dependent Surveillance-Broadcast (ADS-B) out signal transmitted by a first transport vehicle;

receiving, by the wireless tracking tag, a second ADS-B out signal transmitted by a second transport vehicle, different from the first transport vehicle;

receiving, by the wireless tracking tag, a third ADS-B out signal transmitted by a third transport vehicle, different from both the first transport vehicle and the second transport vehicle; and estimating, by the wireless tracking tag, a current location of the wireless tracking tag based on locations defined in at least one of the first ADS-B out signal, the second ADS-B out signal, and the third ADS-B out signal, wherein the wireless tracking tag comprises a battery, an ADS-B out receiver implementing a first wireless communication protocol, a processor, and memory.

17. The method of claim 16, further comprising:

determining, by the wireless tracking tag, respective signal strengths of each of the first ADS-B out signal, the second ADS-B out signal, and the third ADS-B out signal; and triangulating, by the wireless tracking tag, the current location based on the respective signal strengths and the locations defined in each of the at least one of the first ADS-B out signal, the second ADS-B out signal, and the third ADS-B out signal.

18. The method of claim 16, further comprising:

associate, with the wireless tracking tag, a transport vehicle identifier received in one of the first ADS-B out signal, the second ADS-B out signal, and the third ADS-B out signal having the greatest signal strength; and determine a current location of the wireless tracking tag based on an updated location contained in each subsequently received ADS-B out signal containing the same transport vehicle identifier.

19. The method of claim 16, further comprising determining, by the wireless tracking tag, that the estimated location of the wireless tracking tag is different from an expected location of the wireless tracking tag.

20. The method of claim 19, wherein the expected location corresponds to a location of a transport vehicle associated with an asset, the asset associated with the wireless tracking tag.

* * * * *